Figure 1:
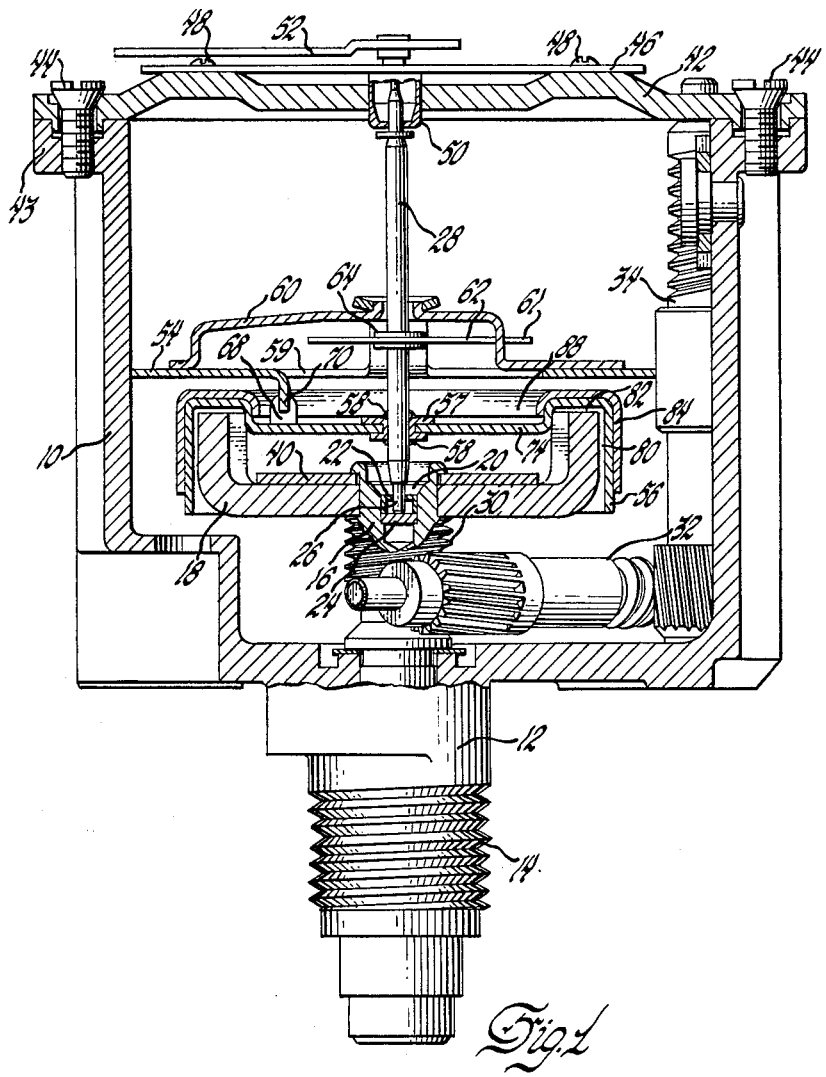

Jan. 15, 1963  R. O. HELGEBY  3,073,978
MAGNETICALLY DRIVEN INSTRUMENTS
Filed Nov. 10, 1958

INVENTOR.
Ralph O. Helgeby
BY
George E. Johnson
ATTORNEY

United States Patent Office 3,073,978
Patented Jan. 15, 1963

3,073,978
MAGNETICALLY DRIVEN INSTRUMENTS
Ralph O. Helgeby, Flint, Mich., assignor to General Motors Corporation, Detroit, Mich., a corporation of Delaware
Filed Nov. 10, 1958, Ser. No. 772,886
1 Claim. (Cl. 310—97)

This invention relates to magnetically driven instruments and more particularly to instruments employing indicators such as pointers or drums rotated by speed cups against the biasing action of springs.

In instruments such as speedometers and tachometers, pointers or drums are rotated by spindles journaled in bearings within the instrument casings. The pointers or drums cooperate with indicia on dials or on the drums to indicate the instrument readings. An instrument employing a pointer is disclosed in the United States Patent 2,798,174 granted July 2, 1957, to Ralph O. Helgeby. An instrument including a speedometer drum is disclosed in the United States Patent 2,802,442 granted August 13, 1957, to Ralph O. Helgeby. The instant invention may be used with either type of instrument and pertains to the driving means specifically and involving a speed cup and magnet.

An object of the present invention is to provide an improved instrument employing a magnetically driven speed cup for actuating a spindle which in turn is adapted to rotate or impart motion to an indicator.

Another object of the invention is to provide an instrument such as a speedometer or tachometer in which a rotating magnet is adapted to exercise a drag effect on a speed cup without the necessity of using a conventional separate field plate.

Another object is to provide an instrument in which only one air gap need be traversed by the magnetic flux thereby to attain a strong indicator movement.

A feature of the present invention comprises an annulus or covering of high permeability composition fixed to the exterior of a speed cup and surrounding a rotatable magnet adapted to actuate an instrument. Another feature resides in a speedometer type instrument in which a single air gap is provided through which flux lines from the magnet are effective in driving the speed cup.

These and other important features of the invention will now be described in detail in the following specification and then pointed out more particularly in the appended claim.

Figure 2:
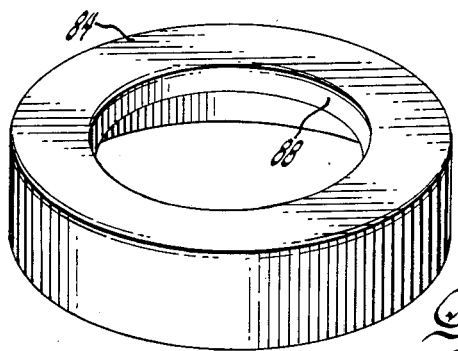

In the drawings:

FIG. 1 is a sectional view through a pointer type speedometer in which the present invention is embodied; and FIG. 2 is a perspective view of an annulus or covering of high permeability composition which is utilized in the assembly shown in FIG. 1.

Many of the elements shown in the drawings are conventional and are similar to those disclosed in the United States Patent 2,798,174 referred to above. The instrument is provided with a casing 10 having a projection 12 thereon which is threaded as at 14 to form a suitable connection for the end of a conduit guiding the end of a drive cable. Such conduits and cables are not illustrated but are well known, and it will be understood that the drive cable is for rotating a shaft 16 to thereby rotate a permanent U-shaped magnet element 18 within the casing. The end of the shaft 16 is recessed as at 20 to retain bearing members 22 and 24. The bearing member 22 surrounds a reduced end portion 26 of a spindle 28 to prevent lateral motion of the latter. The bearing 24 is adapted to absorb thrust by engaging one end of the spindle 28.

The shaft 16 has spiral teeth 30 and it will be understood that these are utilized to drive two shafts 32 and 34 for operating an odometer, not shown but included within the casing 10. The shafts 32 and 34 and the gearing associated therewith may be ignored as they form no part of the present invention and as they are conventional in speedometers.

Fixed within the magnet 18 and securely clamped to the shaft 16 to rotate therewith is a temperature compensator element 40 which may be ignored as it constitutes no part of the present invention. Such an element is shown in the United States Patent 1,848,068 granted March 1, 1932, in the name of I. T. Wedin.

The casing 10 is in the form of a cup and is provided with a cover 42 attached to a flange 43 of the casing by means of screws 44. A dial 46 with suitable insignia or scaled graduations thereon is attached to the cover 42 by means of screws 48.

One end of the spindle 28 protrudes from a bearing member 50 located in the center of the cover 42. The spindle protrudes through the dial 46 and supports a pointer 52 adapted to register with the graduations on the dial.

It will be noted that in the Patent 2,798,174, referred to above, a field plate with an outer cylinder configuration is provided around a speed cup to support a hair spring. In the instant development such a field plate is omitted and in place thereof a support 54 in the form of a flat plate is mounted in the casing 10 in a plane transverse to the axis of the spindle 28. This support is provided with a central opening 59 with a bridge member 60 against the side of which one radially extending end 61 of a spiral biasing spring 62 is adapted to bear. The other end of the spring is attached to a hub 64 formed on the spindle 28. An edge around an opening cut in the bridge member 60 constitutes a limit stop or shoulder against which the spring acts in counteracting the magnetic forces exerted to rotate the pointer 52. This is an adaptation of the conventional hair spring action.

A speed cup 56 is fixed to the spindle 28 by means of a hub 57 and solder 58. The central portion of the speed cup is depressed as at 74 to extend within the ends of the U-shaped magnet 18.

A tab or second limit stop 68 is formed on the speed cup and is adapted to engage a fixed stop portion 70 integral with the support plate 54.

A predetermined clearance or air space 80 is provided between the inner cylindrical wall of the speed cup 56 and the legs of the U-shaped magnet 18. A radial air space 82 is also provided between the ends of the magnet legs and the radial wall of the speed cup.

The speed cup 56 is made of low permeability and low electrical resistance metal and is preferably of aluminum. It may be made of copper, silver or gold. Such speed cups are widely used in instruments of the type herein considered.

An annulus or cover 84 of high permeability material and also possessing a low electrical resistance is fitted to the speed cup 56 and adapted to rotate therewith. It may be made of steel and nested together with the speed cup with an inner flange 88 extending into the depressed portion of the speed cup. In place of steel, this cover or annulus may be made of iron particles or ferrous dust adhesively attached to the speed cup. The attachment of the cover or annulus to the speed cup may be by rivets or other means.

Rotation of the shaft 16 serves to rotate the maget 18 at the same speed and, as a consequence, the flux linkage from the magnet exerts a dragging influence on the speed cup 56 which is proportional to the speed or revolutions per minute of the magnet to create a proper measurement by virtue of the resultant position of the pointer 52 with respect to the dial. This rotative effect of the speed cup is against the action of the spring 62 which tends to return the pointer to its zero position as determined by the stop 70 when rotation by driving action on the shaft 16 terminates. The resistive force exerted by the spring 62 is proportional to the extent of angular movement from zero attained by the pointer by magnetic force.

By the utilization of the simple, inexpensive annulus 84 of soft steel or ferrous material as fixed in contact with the outside walls of the speed cup, it is possible to dispense with the conventional, separate and far more expensive steel field plate conventionally used to surround the speed cup. This also results in a reduction of air gap to be traversed by the magnetic flux from the magnet and greatly increases the magnetic drag on the speed cup. It permits a proportionately stronger hair spring 62 which in turn improves the performance and accuracy of the instrument. In addition, the elimination of the conventional field plate makes it possible to adopt a smaller diameter speed unit and a more flexible design in given installations.

I claim:

An instrument such as a tachometer comprising a casing, a spindle journaled in said casing, a hairspring support in said casing, a hairspring with one end abutting said hairspring support and the other end fixed to said spindle, a U-shaped magnet mounted in said casing for rotation of its end portions around the axis of said spindle, a speed cup of low permeability and low electrical resistance sheet metal surrounding said magnet and fixed to said spindle, an annulus of high permeability and low electrical resistance material formingn a layer on the exterior wall of said speed cup and extending in a radial direction from said spindle along an end of each end portion of said magnet and also in the direction of said spindle along one side of each end portion of said magnet, each end portion of said magnet and the speed cup defining an air gap between them, and the arrangement being such that said magnet is adapted to function as a driver means and said speed cup, annulus and spindle are adapted to rotate against said hairspring as a unitary driven means for actuating an indicator.

References Cited in the file of this patent

UNITED STATES PATENTS

| 2,754,438 | Zozulin | July 10, 1956 |
| 2,773,206 | Zozulin | Dec. 4, 1956 |
| 2,798,174 | Helgeby | July 2, 1957 |

FOREIGN PATENTS

| 50,728 | Switzerland | Jan. 31, 1910 |